US011271446B2

(12) United States Patent
Deng et al.

(10) Patent No.: US 11,271,446 B2
(45) Date of Patent: Mar. 8, 2022

(54) STATOR WINDING METHOD AND STATOR CORE WINDING

(71) Applicant: FORD GLOBAL TECHNOLOGIES, LLC, Dearborn, MI (US)

(72) Inventors: Chuan Deng, Nanjing Jiangsu (CN); Yigang Yuan, Nanjing Jiangsu (CN); Guohua Du, Nanjing Jiangsu (CN); Xusheng Zhang, Nanjing Jiangsu (CN)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 16/525,254

(22) Filed: Jul. 29, 2019

(65) Prior Publication Data

US 2020/0212747 A1 Jul. 2, 2020

(30) Foreign Application Priority Data

Jul. 30, 2018 (CN) .......................... 201810854318.4

(51) Int. Cl.
*H02K 3/28* (2006.01)
*H02K 1/16* (2006.01)

(52) U.S. Cl.
CPC ............... *H02K 3/28* (2013.01); *H02K 1/165* (2013.01)

(58) Field of Classification Search
CPC .......... H02K 1/16; H02K 1/165; H02K 5/225; H02K 3/28; H02K 3/12
See application file for complete search history.

(56) References Cited

U.S. PATENT DOCUMENTS 3,622,823 A * 11/1971 Broadway ................ H02K 3/28
310/216.072
5,539,265 A 7/1996 Harris et al.
(Continued)

OTHER PUBLICATIONS

Takashi Ishigami et al., "Motor Stator With Thick Rectangular Wire Lap Winding for HEVs", Jan. 13, 2015, https://ieeexplore.ieee.org/document/70084301/, 3 pgs.

*Primary Examiner* — Naishadh N Desai
(74) *Attorney, Agent, or Firm* — David B. Kelley; Brooks Kushman P.C.

(57) ABSTRACT

One or a plurality of embodiments of the present application provide a winding method for a stator winding. The method comprises positioning a first wire in a first direction according to a first rule, wherein the first rule is continuously positioning the first wire from a first layer in the first direction at a spacing of R slots in a layer number ascending manner until passing through an Mth layer; in the Mth layer, subjecting the first wire to pass a first same-layer transition and pass through a next slot having a spacing of R; positioning the first wire in a second direction according to a second rule, wherein the second rule comprises positioning the first wire at the spacing of R slots in a layer number descending manner until passing through the first layer; and in the first layer, subjecting the first wire to pass a second same-layer transition and pass through a next slot having the spacing of R, wherein the first wire advances in the same direction in the first same-layer transition and the second same-layer transition; and advancing the first wire by repeating following the first rule, passing the first same-layer transition, following the second rule, and passing the second same-layer transition until the first wire fills up the M layers of the stator without crossing itself, where M is a total number of layers of the first wire in stator slots.

7 Claims, 14 Drawing Sheets

(56) References Cited

U.S. PATENT DOCUMENTS

| | | |
|---|---|---|
| 6,759,779 B2 | 7/2004 | Neet |
| 8,667,666 B2 | 3/2014 | Sadiku et al. |
| 8,966,742 B2 | 3/2015 | Wolf et al. |
| 2003/0015932 A1 | 1/2003 | Oohashi et al. |
| 2003/0214196 A1* | 11/2003 | Cai .................... H02K 3/14 |
| | | 310/208 |
| 2004/0074080 A1 | 4/2004 | Kato et al. |
| 2005/0110360 A1* | 5/2005 | Neet .................... H02K 3/12 |
| | | 310/208 |
| 2017/0324293 A1 | 11/2017 | Bauer et al. |
| 2018/0198353 A1* | 7/2018 | Kuroyanagi ........... H02K 3/28 |

\* cited by examiner

STATOR WINDING METHOD AND STATOR CORE WINDING

CROSS-REFERENCE TO RELATED APPLICATION

This application claims foreign priority benefits under 35 U.S.C. § 119(a)-(d) to CN Application 2018 108 543 184, filed Jul. 30, 2018, which is hereby incorporated by reference in its entirety.

TECHNICAL FIELD

The present application relates to a stator winding method and a stator core winding.

BACKGROUND

Motors have wide application in vehicles and other fields. With the further development of science and technology, and the increased development in electric vehicles, the bar has been raised for motor requirements. Take a vehicle as an example. In a hybrid vehicle or an electric vehicle, a motor is required to be provided in a limited space and efficiently support a vehicle's operation under different conditions, and provide a high enough torque output. For a conventional vehicle, increasingly high requirements are also demanded for motor performance because of the increase of various vehicle-mounted electric accessories.

Typically, the motor includes a rotor in the center and a stator approximately in the shape of a cylinder. The rotor and the stator have respective windings formed by winding wires. Wires of motor stators generally fall into two categories: round wires and rectangular wires. Many winding modes exist in the prior art. For example, U.S. Pat. No. 8,966,742 discloses a method for manufacturing a stator winding for a motor. It is specifically disclosed that a one phase wire is extended in a serpentine manner in a first direction X, and in a shape of a wave in a second direction Y.

SUMMARY

According to one aspect of the present application, a winding method for a stator winding is provided. The method comprises positioning a first wire in a first direction according to a first rule, wherein the first rule is continuously positioning the first wire from a first layer in the first direction at a spacing of R slots in a layer number ascending manner until passing through an Mth layer; in the Mth layer, subjecting the first wire to pass a first same-layer transition and pass through a next slot having a spacing of R; positioning the first wire in a second direction according to a second rule, wherein the second rule comprises positioning the first wire at the spacing of R slots in a layer number descending manner until passing through the first layer; and in the first layer, subjecting the first wire to pass a second same-layer transition and pass through a next slot having the spacing of R, wherein the first wire advances in the same direction in the first same-layer transition and the second same-layer transition; and advancing the first wire by repeating following the first rule, passing the first same-layer transition, following the second rule, and passing the second same-layer transition until the first wire fills up the M layers of the stator without crossing itself, where M is a total number of layers of the first wire in stator slots. In some embodiments, M is an integer greater than or equal to 4.

In one embodiment, the stator is provided with N slots, where M and N are integers, and R is equal to the slot number N divided by a pole number of the stator winding, wherein when in the first and second same-layer transition, the first wire passes, in the second direction, through a next slot having the spacing of R that is in the same layer, the Mth layer, and the first layer.

In another embodiment, the stator is provided with N slots, where M and N are integers, and R is equal to the slot number N divided by a pole number of the stator winding, wherein when in the first same-layer transition and the second same-layer transition, the first wire passes, in the first direction, through a next slot having the spacing of R that is in the same layer, the Mth layer, and the first layer.

In still another embodiment, N=48, M=6, and R=6.

In still another embodiment, N=48, M=8, and R=6.

In yet another embodiment, the first direction is a clockwise direction, whereas the second direction is a counterclockwise direction.

In still another embodiment, the first direction is a counterclockwise direction, whereas the second direction is a clockwise direction.

In yet another embodiment, a slot number N=a slot number per pole per phase*a pole number*a phase number, where the slot number per pole per phase is an integer phase number from 1 to 5, where the slot number per pole per phase is an integer of 1, 2, 3, 4, or 5; the pole number is 2, 4, 6, 8, 10, or 12; and the phase number is an integer of 1, 2, 3, 4, or 5.

In some embodiments, a total slot number N is 36, 48, or 72.

In still another embodiment, the layer number M is 4, 5, 6, 7, 8, 9, 10, 11, or 12.

In still another embodiment, the method further comprises positioning a second wire in the same manner as that of the first wire: following the first rule, passing the first same-layer transition, following the second rule, and passing the second same-layer transition, wherein a starting slot of the second wire is different from a starting slot of the first wire.

In yet another embodiment, a first phase conductor comprises first lead wire segments and second lead wire segments as well as a plurality of U-shaped wire segments located between the first lead wire segments and the second lead wire segments.

In still another embodiment, the stator comprises a first end and a second end opposite to the first end; N slots are located between the first end and the second end; an ith U-shaped wire segment comprises a U-shaped crown located at the first end, a first supporting leg and a second supporting leg connected to the U-shaped crown, and a first connecting part and a second connecting part located at the second end and respectively connected to the first supporting leg and the second supporting leg; and the first supporting leg and the second supporting leg of the ith U-shaped wire segment are respectively located in two slots having the spacing of R; an (+1)th U-shaped wire segment comprises a U-shaped crown located at the first end, a first supporting leg and a supporting second leg connected to the crown, and a first connecting part and a second connecting part located at the second end and respectively connected to the first supporting leg and the second supporting leg; and the first supporting leg and the second supporting leg of the (i+1)th U-shaped wire segment are respectively located in two slots having the spacing of R; the second connecting part of the ith U-shaped wire segment and the first connecting part of the (i+1)th U-shaped wire segment are connected to form a bunched part located at the first end; and the U-shaped crowns and the bunched parts alternately advance so that the first wire is positioned in the slots according to the first rule and the second rule.

In one embodiment, a first supporting leg and a second supporting leg of a U-shaped wire located in the innermost layer or the outermost layer are in the same layer of two slots having the spacing of R. Further, a first supporting leg and a second supporting leg of each of a plurality of U-shaped wires located between the innermost layer and the outermost layer are respectively located in adjacent layers of two slots having the spacing of R.

In one embodiment, the first phase conductor is provided with a rectangular or square cross section.

According to another aspect of the present application, a stator core winding for a motor is provided, wherein the stator core winding is wound in N slots of a stator and forms M layers. The stator core winding comprises: a first wire, wherein the first wire passes through a first layer of a first slot to be positioned in a first direction according to a first rule, the first rule comprising positioning the first wire at a spacing of R slots in a layer number ascending manner until reaching an Mth layer; in the Mth layer, the first wire passes a first same-layer transition and advances to the Mth layer having the spacing of R; the first wire is positioned in a second direction opposite to the first direction according to a second rule, the second rule comprising positioning the first wire at the spacing of R slots in a layer number descending manner until reaching the first layer; in the first layer, the first wire passes through a second same-layer transition and advances to the first layer having the spacing of R; the first wire advances in the first direction and the second direction by repeating the manner of following the first rule, passing the first same-layer transition, following the second rule, and passing the second same-layer transition until the first wire fills up the M layers without crossing itself and extends out from the first layer, wherein the first same-layer transition and the second same-layer transition are in the same direction.

In one embodiment, N=48, R=6, and M=6.

In another embodiment, N=48, M=8, and R=6. In some examples, the first wire is a first phase conductor, and the stator core winding further comprises a second phase conductor and a third phase conductor, wherein the second phase conductor and the third phase conductor both start from the first layer, and are wound on the stator according to the same rule the first phase conductor follows.

In yet another embodiment, the first direction is a clockwise direction, whereas the second direction is a counterclockwise direction.

In still another embodiment, the first direction is a counterclockwise direction, whereas the second direction is a clockwise direction.

In still another embodiment, the first wire is formed by a plurality of wire segments; the stator comprises a first end and a second end opposite to the first end; N slots are located between the first end and the second end; an ith U-shaped wire segment comprises a U-shaped crown located at the first end, a first supporting leg and a second supporting leg connected to the U-shaped crown, and a first connecting part and a second connecting part located at the second end and respectively connected to the first supporting leg and the second supporting leg; and the first supporting leg and the second supporting leg of the ith U-shaped wire segment are respectively located in two slots having the spacing of R; an (i+1)th U-shaped wire segment comprises a U-shaped crown located at the first end, a first supporting leg and a supporting second leg connected to the crown, and a first connecting part and a second connecting part located at the second end and respectively connected to the first supporting leg and the second supporting leg; and the first supporting leg and the second supporting leg of the (i+1)th U-shaped wire segment are respectively located in two slots having the spacing of R; the second connecting part of the ith U-shaped wire segment and the first connecting part of the (i+1)th U-shaped wire segment are connected to form a bunched part located at the first end; and the U-shaped crowns and the bunched parts alternately advance so that the first wire is positioned in the slots according to the first rule, passing the first same-layer transition, following the second rule, and passing the second same-layer transition, wherein the first wire is provided with a rectangular or square cross section.

According to yet another aspect of the present application, a stator for a motor is provided, comprising: a first end; a second end; a main body connecting to the first end and the second end, wherein the main body comprises a hollow inner wall; N slots, wherein the N slots are formed on the inner wall, located between the first end and the second end, and face a central axis of the main body, and are provided with a depth accommodating a cross section of M layers of wires; and a winding, comprising a first wire, wherein the first wire passes through a first layer of a first slot to be positioned in a first direction according to a first rule, the first rule comprising positioning the first wire at a spacing of R slots in a layer number ascending manner until reaching an Mth layer; in the Mth layer, the first wire passes a first same-layer transition and advances to a next slot having the spacing of R; the first wire is positioned in a second direction opposite to the first direction according to a second rule, the second rule comprising positioning the first wire at the spacing of R slots in a layer number descending manner until reaching the first layer; in the first layer, the first wire passes through a second same-layer transition and advances to a next slot having the spacing of R; the first wire advances in the first direction and the second direction by repeating the manner of following the first rule, passing the first same-layer transition, following the second rule, and passing the second same-layer transition until the first wire fills up the M layers without crossing itself and extends out from the first layer, wherein the same-layer transition in the Mth layer and the same-layer transition in the first layer are in the same direction.

The above and other advantages and features of the present application will become apparent by merely referring to the following detailed description of embodiments or in combination with the accompanying drawings.

BRIEF DESCRIPTION OF DRAWINGS

In order to make those skilled in the art to fully understand the embodiments of the present application, reference should be made to more detailed illustration for the accompanying drawings and embodiments described below through examples, wherein FIG. 1 schematically shows a perspective view of a stator having a stator winding according to an embodiment of the present application;

FIGS. 6A and 6B show an inter-slot and inter-layer winding manner of a winding having 6 layers of wires according to a second embodiment of the present application;

DETAILED DESCRIPTION

Figure 1:
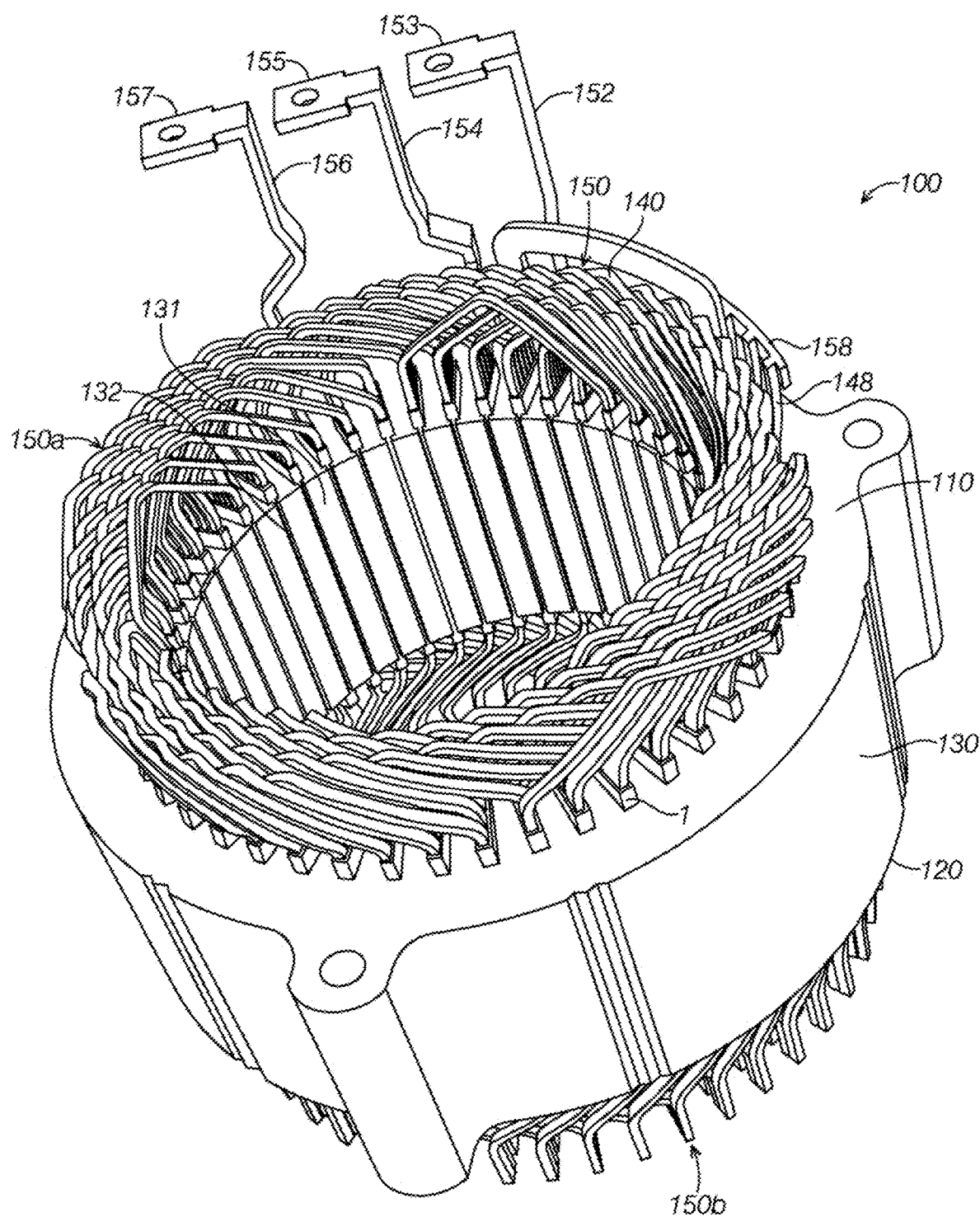

For reference numerals in the drawings, the same or similar reference numerals are used to indicate the same or similar components. In the description below, multiple operation parameters and components are described in multiple embodiments. These specific parameters and components are included herein as examples only and are not meant to be limiting.

Specific embodiments of the present application are disclosed in this description as needed; however, it should be understood that the disclosed embodiments are only examples of the present application and may be implemented in various alternative forms. The drawings do not need to be drawn to scale; some features may be enlarged or shrunk to display details of specific components. Therefore, the specific structures and functional details disclosed herein should not be construed as limiting, but represents a basis for teaching those skilled in the art to implement the present application in many forms.

As mentioned in the Background, motors are widely used and increasingly high requirements are also demanded for motor performance. The positioning of a wire directly affects motor performance. For a stator winding, round wires have the features of simple winding but a low slot fill factor. When round wires are stacked on one another, the spacings between cross sections of the wires are inevitable. Rectangular wires have the features of a high slot fill factor but complex winding. Currently, because increasingly high requirements are demanded for the new energy-driven motor performance, an increasing demand for rectangular wires exists. The winding manner of rectangular wires therefore becomes one of the research focuses. The inventors of the present application realize that since a rectangular wire has a large cross-sectional area and cannot bend easily like a round wire, having a non-crossing winding manner among wires becomes one of the design points. Meanwhile, due to the limited space between the upper and lower ends of a motor, how to compactly position non-crossing rectangular wires between the upper and lower ends of the motor also becomes one of the design points. Additionally, since the rectangular wire has the features of large cross-sectional areas and is not easy to bend, ways of winding the rectangular wire in a limited space are restricted. The inventors of the present application are aware of the need for a novel winding manner for implementing a compact winding.

Many factors affect motor performance; based on needs, those skilled in the art can select appropriate parameters of a rotor and a stator. One or a plurality of embodiments of the present application will mainly focus on the winding setting of the stator. Firstly, the stator has a certain slot number and pole number (magnetic pole pair number). A loop is formed by one turn of winding; that is, magnetic poles appear in pairs. These windings generate magnetic fields when a current passes therethrough; and accordingly, magnetic poles exist. For example, each group of coils of a three-phase alternating current motor generates an N magnetic pole and an S magnetic pole; and the number of magnetic poles included in each phase of each motor is the pole number. Since magnetic poles appear in pairs, the motor has the pole number such as 2, 4, 6, 8, 10, or 12. The pole number, which is an important parameter, has a functional relationship with the rotation speed of the motor. Another important parameter a of the motor is the slot number per pole per phase, namely, the number of slots occupied by each pole and phase group. When the slot number a per pole per phase is higher, the waveform of the motor is closer to the sine. However, the motor would accordingly have many more slots, which in turn and to a certain degree affects manufacturability. In one or a plurality of embodiments of the present application, the slot number a per pole per phase may be 1, 2, 3, 4, or 5. In some embodiments, for an 8-pole motor and for a 3-phase motor, when a=1, the slot number may be designed as 1*8"3=24. When a=2, the slot number—may be designed as 48. Other numbers can be deduced in the same manner. In addition, each phase of a winding may also form a phase group by one or a plurality of wires. If the motor has high rate power—and large current, more than one wire may be used for a parallel winding. Those skilled in the art may select appropriate parameters according to needs. The winding manner may be illustrated below using a plurality of specific embodiments. It can be understood that a variety of designs for the stator can be made without departing from the spirit of the present application.

Please refer to FIG. 1. In one or a plurality of embodiments of the present application, a stator core 100 is provided with a first end 110 and a second end 120 opposite to the first end 110, and a main body 130 located between the first end 110 and the second end 120. An inner wall 131 of the main body 130 is provided with a plurality of slots 132. The plurality of slots 132 face a central axis of the core 100 and have a certain depth that can accommodate M layers of wires. In some embodiments, the cross section of the slot 132 may be rectangular. A wire 140 is then positioned in the slots 132 according to a certain rule; and one or a plurality of wire 140 are positioned to form a winding 150. The winding 150 may have a coronal end 150a corresponding to the first end 110 and a bunched end 150b (also referred to as a welded end) corresponding to the second end 120, and vice versa. The wire 140 used in the embodiment of the present application is a rectangular wire. In other words, the cross sections of the wire 140 may be square or rectangular. In the first end 110 of the stator, the winding 150 is provided with wire ends 153, 155, 157 formed by means of lead terminals 152, 154, and 156. The figure shows the stator winding 150 having three phases. One ends of the three phases are connected to one another to form a phase tail wire end 158; the other ends of the three phases respectively form into the terminals 153, 155, 157 as described above. Each phase conductor may have a single or a plurality of parallel wire groups. The connection method as shown in the figure may be referred to as a star connection manner. It is to be understood that based on needs, more or fewer wire ends and adaptively adjusted connection manners may exist. In FIG. 1, the lead terminals 152, 154, 156 and the wire ends 153, 155, 157 are located at the coronal end 150. It is to be understood that the terminals may also be located at the other end or other suitable positions.

According to one or a plurality of embodiments of the present invention, an implementation of an M-layer winding in N slots of the stator core is explained; a single wire of the same phase has an inter-slot spacing of R. The inter-slot spacing or slot spacing R for short is obtained by dividing the total slot number N of the motor with the pole number. In one or a plurality of embodiments, the winding manner or positioning of the wire is as follows: winding from a first layer of a first slot to an Mth layer according to a first rule; in the Mth layer, the wire passes through a first same-layer transition and extends to a next slot having a spacing of R; winding to the first layer according to a second rule; and in the first layer, the wire passes through a second same-layer transition and extends to a next slot having the spacing of R through. The first rule is inserting the wire at a spacing of R slots in a layer number ascending manner in a first direction. The second rule is inserting the wire at the spacing of R slots in a layer number descending manner in a second direction. The manner of winding to the Mth layer according to the first rule, passing through the first same-layer transition, winding to the first layer according to the second rule, and passing through the second same-layer transition is repeated until the wire fills up the M layers in the slots having the spacing of R; and the first same-layer transition and the second same-layer transition are in the same direction.

Figure 2:
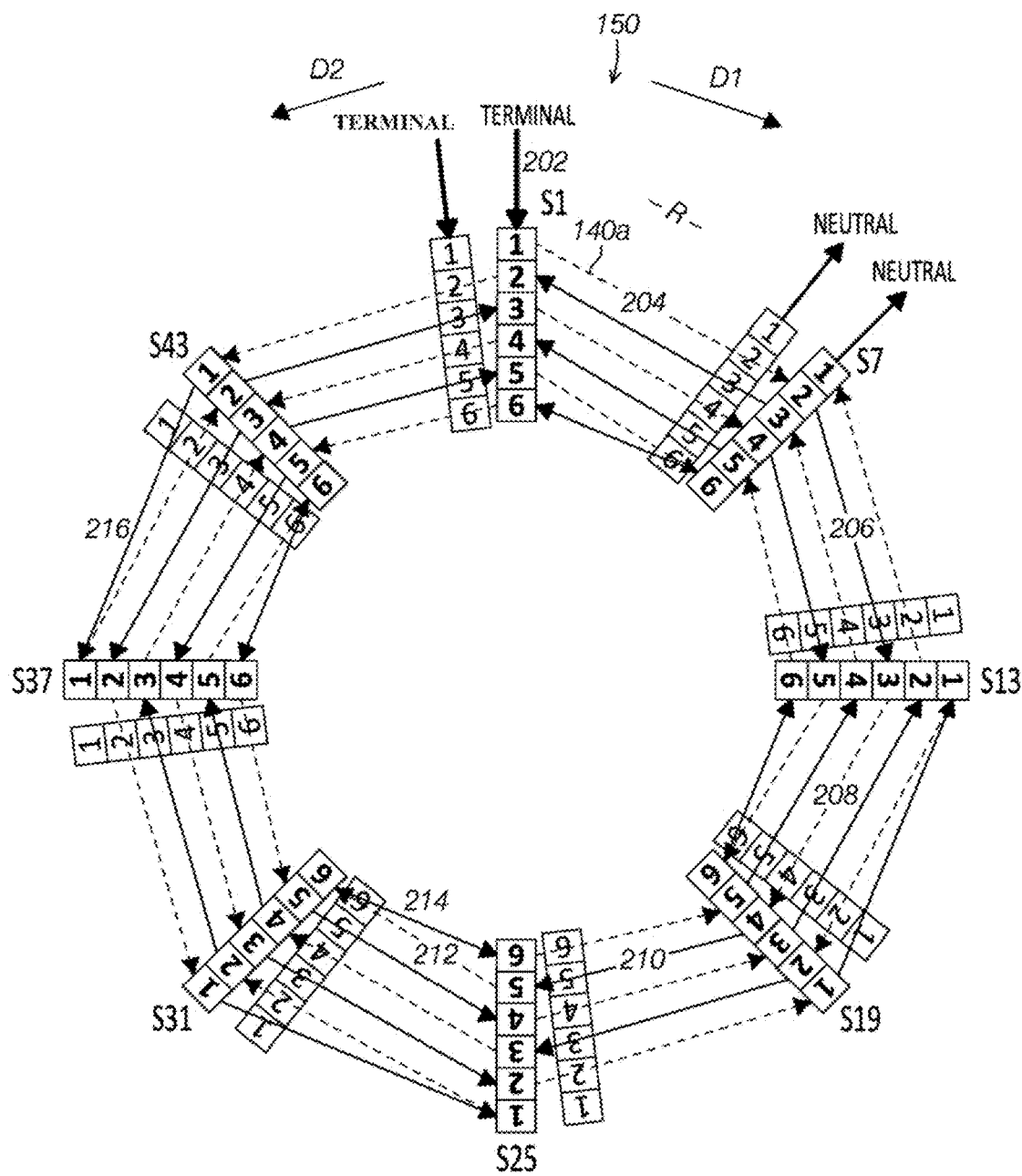
FIG. 2 shows a schematic diagram of an end of an inter-slot and inter-layer winding according to a first embodiment of the present application.
Figure 3:
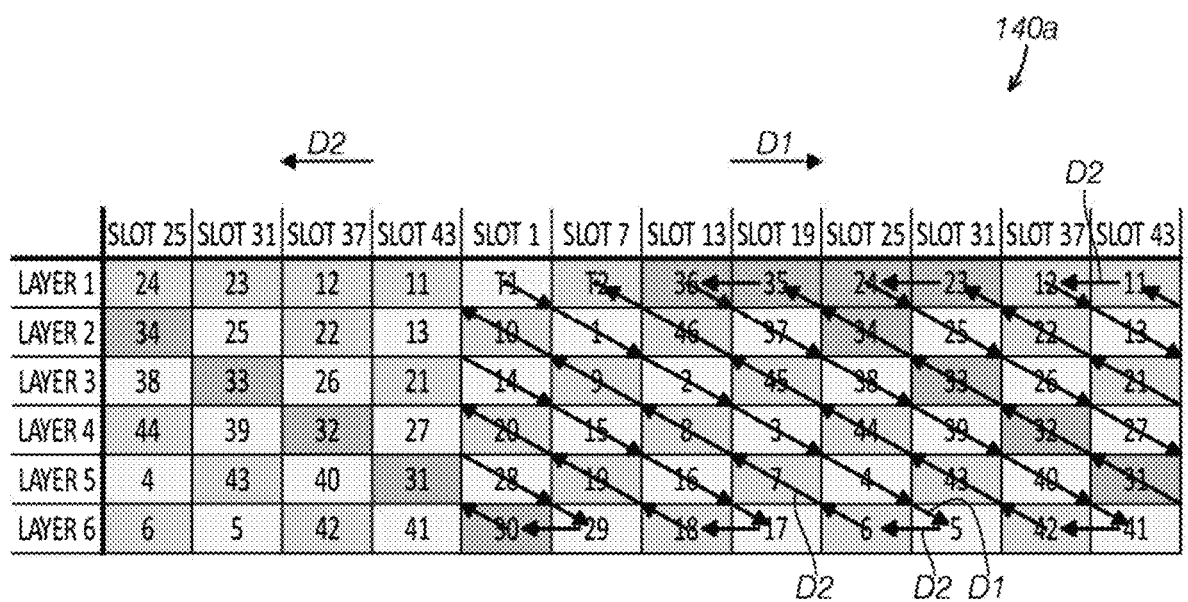
FIG. 3 shows a schematic diagram of a winding direction of a first wire according to the first embodiment.
Figure 4:
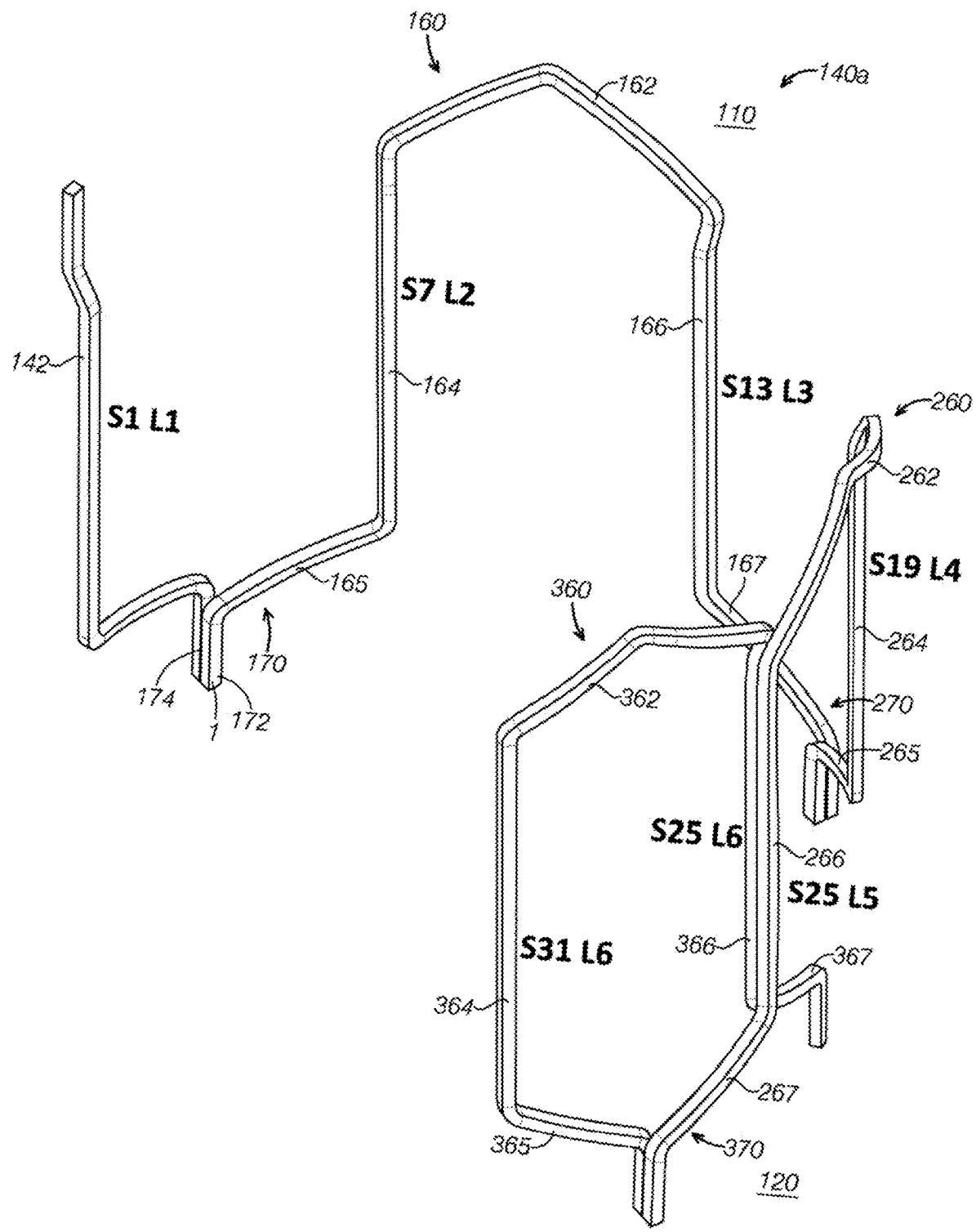
FIG. 4 shows wire segments and a connection mode capable of implementing the winding according to the first embodiment.

FIG. 2 shows a schematic diagram of a specific winding manner or positioning according to a first embodiment of the present application. FIG. 3 shows a schematic diagram of a winding direction of one complete phase conductor having 6 layers of wires according to the first embodiment shown in FIG. 2; FIG. 4 shows wire segments and a connection capable of implementing the winding manner shown in FIG. 2 and FIG. 3 according to the first embodiment. In the embodiment shown in FIGS. 2 to 4, after the wire is positioned to the Mth layer in the first direction according to the first rule, in the Mth layer, the wire advances, in the second direction, to the next slot having the spacing of R by passing through the first same-layer transition. Afterwards, the wire is positioned in the second direction according to the second rule until the wire returns to the first layer. In the first layer, the wire also advances, in the second direction, to the next slot having the spacing of R by passing through the second same-layer transition; and then the manner of winding to the Mth layer according to the first rule, passing through the first same-layer transition, winding to the first layer according to the second rule, and passing through the second same-layer transition is repeated until the wire fills up the M layers in the slots having the spacing of R. The specific illustration is shown from FIGS. 2 to 4. M being 6 is used for the M-layers for the purpose of illustration in this embodiment. A first wire 140a advances in a first direction D1, namely, a clockwise direction, according to the first rule; and specifically, the first wire 140a is positioned at a slot spacing of R slots and in a layer number ascending manner at the same time. The advancing direction is indicated by arrows. FIG. 2 shows a schematic diagram of a winding direction when a phase of winding of the winding is observed from the coronal end 150a. In this example, the spacing slot number R=total slot number/pole number=48/8=6.

The first wire 140a shown in FIG. 2 passes through a first layer L1 of a first slot S01, S01L1 (the abbreviations for the slot numbers and layer numbers will be used below based on the same rule) as indicated by an arrow 202; afterwards, at the bunched end 150b, the first wire 140a extends and passes through a second layer of a (1+R)th slot (as indicated by a dashed arrow 204), during which, the first wire 140a enters a second layer of a seventh slot S07L2 from (corresponding to the second end 120) the bunched end 150b and passes through (corresponding to the first end 110) the coronal end 150a and extends therefrom. Afterwards, as indicated by a solid arrow 206, at the coronal end 150a, the first wire continues extending through a third layer of a (1+2R)th slot (for example, S13L3), and then extends out from the other end, namely, the bunched end 150b; afterwards, according to this rule, as indicated by a dashed arrow 208, the wire extends through a fourth layer (for example, S19L4) at the bunched end 150b; and as indicated by arrows 210 and 212, the first wire 140a advances until it passes through the Mth layer (for example, S31L6). That is, when the first wire 140a advances in the clockwise direction D1, the first wire 140a is positioned first from the starting point according to the first rule and advances from the first layer L1S1L1 of the first slot S01 as shown in FIG. 2 to S7L2, and further to S13L3, S19L4, S25L5, S31L6; that is, the first wire 140a passes through all the layers (6 layers).

As shown in FIG. 2, in the Mth layer, i.e., the sixth layer, the first wire 140a passes the first same-layer transition in a second direction D2, and extends or advances from S31L6 to S25L6 as indicated by an arrow 214. Then, the wire advances in a layer number descending manner in the second direction D2 (namely, is positioned according to the second rule). The advancing according to the second rule is: S25L6 to S19L5, then to S13L4, then to S7L3, then to S1L2, and finally to S43L1. Afterwards, in the first layer S43L1, the first wire 140a passes through the second same-layer transition still in the second direction D2 and advances or extends to S37L1 as indicated by an arrow 216 in the figure. Then, the first wire 140a is positioned as follows according to the first rule: S37L1 to S43L2, then to S1L3, then to S7L4, then to S13L5, and finally to S19L6; then, in the Mth layer (namely, the sixth layer), the wire continues to pass through the first same-layer transition in the second direction D2 and extends to S13L6: then, the wire is positioned as follows according to the second rule: S13L6 to S675, then to S1L4, then to S43L3, then to S37L2, and finally to S31L1; then, in the first layer, the first wire 140a passes through the second same-layer transition in the second direction D2 and extends to S25L1: then, the first wire 140a is positioned as follows according to the first rule: S25L1 to S31L2, then to S37L3, then to S43L4, then to S1L5, and finally to S7L6; then, in the sixth layer, the wire passes through the first same-layer transition in the second direction and extends to S1L6; then the wire is positioned as follows according to the second rule: S1L6 to S43L5, then to S37L4, then to S31L3, then to S25L2, and finally to S19l1; then in the first layer, the first wire 140a passes through the second same-layer transition in the second direction and extends to S13l1; and then, the first wire 140a is positioned as follows according to the first rule: S13l1 to S19L2, then to S25L3, then to S31L4, then to S3715, and finally to S43L6. In the sixth layer, the wire passes through the first same-layer transition in the second direction and extends to S37L6. Then, the wire is positioned as follows according to the second rule: S37L6 to S31L5, then to S25L4, then to S19L3, then to S1312, and finally to L7L1. In this way, the first wire 140a fills up all the layers without crossing itself and then extends out from S07L1 in the figure. It should be understood that although the start position of the first wire in FIG. 2 is the outermost layer, the first wire 140a may start from the innermost layer. FIG. 2 further shows adjacent slots for winding another wire; yet, for showing the rules with clarity, the arrow directions are omitted. A second wire of the same phase may be positioned in 48 slots of the stator following the same manner. For example, the wire passes through S48, S6, S12, S18, S24, S30, S36, and S42. A third, a fourth, a fifth, and a sixth wire may be positioned in different slots of the stator in the same manner to fill up the 48 slots of the stator, and form 6 layers of wires in each slot.

FIG. 3 further shows the winding manner of the first wire 140a in the first embodiment of FIG. 2. The first wire 140a is wound 6 layers in the stator that has 48 slots. In the table of FIG. 3, the word SLOT shown at the horizontal row shows the slots the first wire 140a extends into, including S1, S7, S13, S19, S25, S31, S37, and S43; and the word LAYER shown at the vertical column represents the number of layers the wire passes through. The same representation is also employed in the following FIG. 7, FIG. 10, FIG. 11, FIG. 14, and FIG. 15. The spacing R between various positions of the first wire 140a is 6. For ease of illustration, numbers are used in FIG. 3 to represent the advancing rule when winding the first wire 140a through slots; arrows are used to represent the advancing direction of the first wire 140a. The numbers themselves do not have specific meaning and are merely used to illustrate the relative advancing positional relationships. Further, in actual production of some embodiments, the wire may not fill up the slots in the order shown in the figures; instead, the wire may be woven into a winding as a whole according to the winding manner of the present application, and then the entire winding is placed in the stator core having N slots. The table in FIG. 3 shows the positioning of the first wire according to the first embodiment in FIG. 2. As the positioning in the table indicates, the first wire 140a is positioned according to the method in the first embodiment of the present application; the first wire 140a is not crossing itself and fills up the 6 layers along the path thereof in the first direction D1 and the second direction D2. In addition, the table also shows that in the first embodiment, when the wire reaches the innermost layer or the outermost layer, namely, the sixth layer or the first layer, the wire advances to the next slot that is in the same layer in the second direction D2.

FIG. 4 shows some parts of the first wire that can be used in the first embodiment shown in FIGS. 2 to 3. The first wire 140a is formed by a plurality of wire segments. The first wire 140a (or referred to as the first phase conductor 140a) includes first lead segments 142 and second lead segments (not shown in FIG. 4, and shown as 148 in FIG. 1) as well as a plurality of U-shaped wire segments located between the first lead segments 142 and the second lead segments 148. FIG. 4 shows only three U-shaped wire segments 160, 260, and 360. Ends of the lead segments 142 and 148 are connected to external wirings, whereas the U-shaped wire segments 160, 260, and 360 are then connected to one another so as to implement the winding manner according to one or a plurality of embodiments of the present application.

Specifically, the first lead segment 142 may be inserted from S1L1; the first U-shaped wire segment 160 may include a U-shaped crown 162 located at the first end 110, a first supporting leg 164 and a second supporting leg 166 connected to the crown 162, and a first connecting part 165 and a second connecting part 167 located at the second end 120 and respectively connected to the first supporting leg 164 and the second supporting leg 166. For the parts of the wire positioned according to the first rule, the first connecting part 165 and the second connecting part 167 respectively extend outward in opposite directions away from the first supporting leg 164 and the second supporting leg 166. The first supporting leg 164 and the second supporting leg 166 of the first U-shaped wire segment 160 in the figure are respectively located in two slots: S7 and S13 having a spacing of R (6 slots); the second U-shaped wire segment 260 adjacent to the first U-shaped wire segment 160 includes a U-shaped crown 262 located at the first end 110, a first supporting leg 264 and a second supporting leg 266 connected to the crown 262, and a first connecting part 265 and a second connecting part 267 located at the second end 120 and respectively connected to the first supporting leg 264 and the second supporting leg 266; and the first supporting leg 264 and the second supporting leg 266 of the second U-shaped wire segment 260 are respectively located in two slots S19 and S25 having the spacing of 6; the third U-shaped wire 360 may similarly include a U-shaped crown 362 located at the first end 110, a first supporting leg 364 and a second supporting leg 366 connected to the U-shaped crown 362, and a first connecting part 365 and a second connecting part 367 located at the second end 120 and respectively connected to the first supporting leg 364 and the second supporting leg 366; and the first supporting leg 364 and the second supporting leg 366 of the third U-shaped wire segment 360 as shown in the figure are respectively located in two slots having the spacing of 6. The first connecting part 365 and the second connecting part 367 have approximately the same bending direction, so as to implement the wire connection at the first same-layer transition. The specific connection manner is shown in the figure. It can be seen that the first connecting part 165 of the first U-shaped wire segment 160 and the first lead segment 142 form a first bunched part 170 located at the second end 120; the second connecting part 167 of the first U-shaped wire segment 160 and the first connecting part 265 of the second U-shaped wire segment 260 form a second bunched part 270 located at the second end 120; and the second connecting part 267 of the second U-shaped wire segment 260 and the first connecting part 365 of the third U-shaped wire segment 360 form a third bunched part 370 located at the second end 120.

Still referring to FIG. 4 in combination with FIGS. 2 and 3, when being positioned to the sixth layer in the first direction (for example, a clockwise direction) according to the first rule, the wire 140a passes through the first same-layer transition in the second direction. The first same-layer transition may be implemented through the third wire segment 360 shown in FIG. 4. The first supporting leg 364 and the second supporting leg 366 of the third wire segment 360 located in the innermost layer, the sixth layer, are in the same layer of two slots having the spacing of 6 (for example, in the figure, the supporting legs of the wire in the innermost layer are located in S31L6 and 25b6). The U-shaped crowns and the bunched parts alternately advance so that the first wire 140a is positioned to the innermost layer or the outermost layer according to the first rule or the second rule, thereby implementing the winding where the wire fills up all the layers of this phase shown in FIGS. 2 and 3. For example, the positioning of the alternate advancing of the U-shaped crowns and the bunched parts is 170, 162, 270, 262, and 370. Generally, an ith U-shaped wire segment of the wire includes a U-shaped crown. The ith U-shaped wire segment includes a U-shaped crown located at the first end, a first supporting leg and a supporting second leg connected to the crown, and a first connecting part and a second connecting part located at the second end and respectively connected to the first supporting leg and the second supporting leg; and the first supporting leg and the second supporting leg of the ith U-shaped wire segment are respectively located in two slots having the spacing of R. An (i+1)th U-shaped wire segment includes a U-shaped crown located at the first end; a first supporting leg and a supporting second leg connected to the crown; and a first connecting part and a second connecting part located at the second end and respectively connected to the first supporting leg and the second supporting leg. The first supporting leg and the second supporting leg of the (i+1)th U-shaped wire segment are respectively located in two slots having the spacing of R; the second connecting part of the ith U-shaped wire segment and the first connecting part of the (i+1)th U-shaped wire segment are connected to form a bunched part located at the first end; and the U-shaped crowns and the bunched parts alternately advance to the innermost layer or the outermost layer.

In the aforementioned embodiment, crowns of one or a plurality of wires may form the coronal end 150a of the winding that corresponds to the first end 110 of the stator; bunched parts of one or a plurality of wires may form the bunched end 150b of the winding that corresponds to the first end 110 of the stator.

Figure 5:
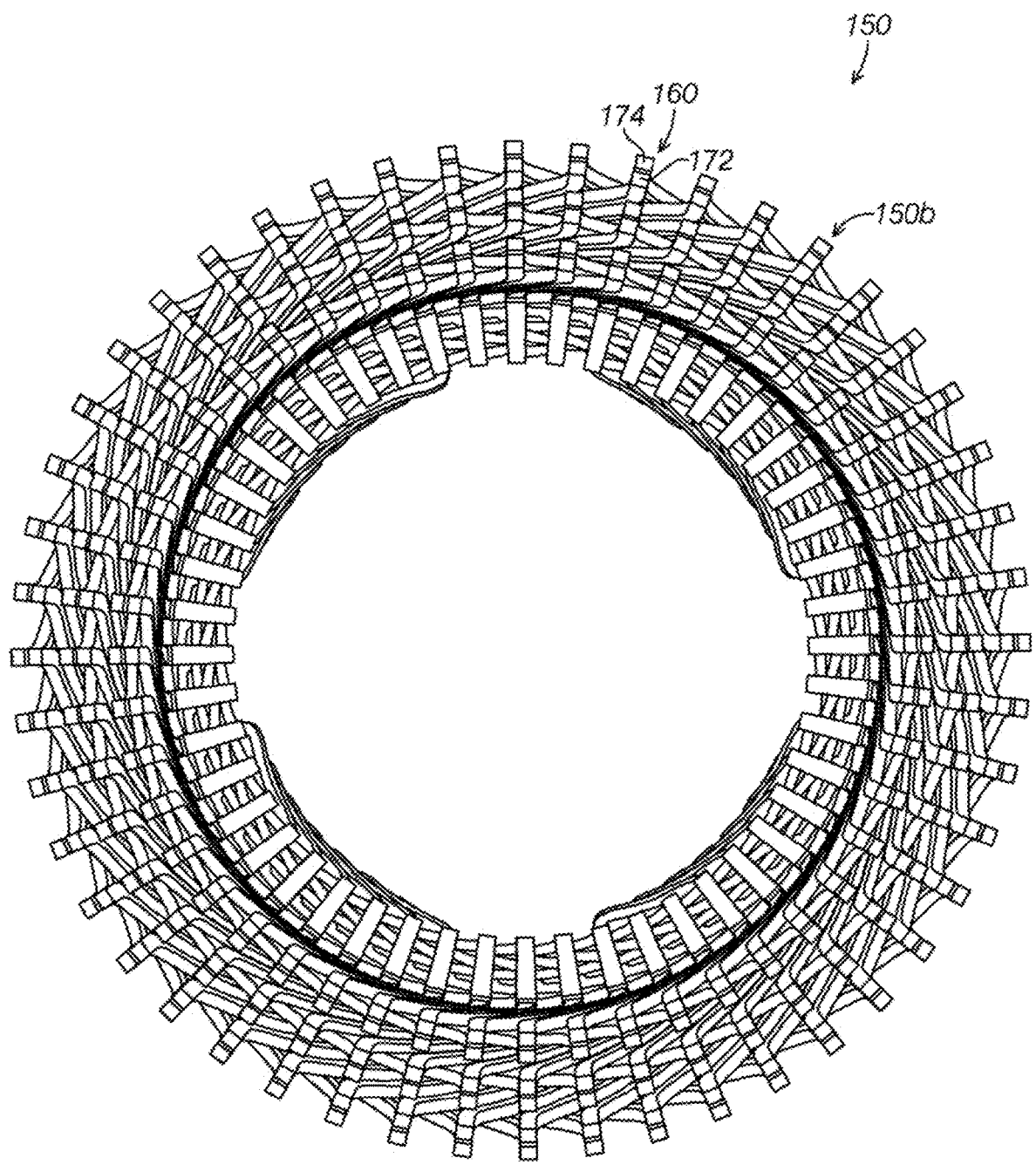
FIG. 5 shows a schematic diagram of a bunched end of the winding according to the first embodiment.

FIG. 5 shows a schematic diagram of a bunched end 150b of the winding according to the first embodiment. Ends of connecting parts of a plurality of wire segments are welded to each other to form a wire, such as the first wire. For example, FIG. 4 and FIG. 5 show that an end 172 of the first connecting part 165 of the first U-shaped wire segment 160 and an end 174 of the first lead segment 142 located at the second end 120 are welded to connect the two wire segments. Because of the sequential winding, the crown and the bunched part have smooth bending angles (namely, no sharp bending angles are observed), which facilitates the connection of wire segments having rectangular cross sections. Thus, desirable adhesion performance is provided when an insulating paint is applied, thereby avoiding problems such as insulating paint detachment that may occur when the bending has a sharp angle.

Referring to FIGS. 1, 4, and 5, in some embodiments, in wire positioning according to the embodiment of the present application, each individual wire segment is inserted into slots of the stator and are bent to form bunched parts; and then ends of connecting parts of corresponding wire segments are connected to each other to form one phase conductor. The connection, which for example can be done via welding, of ends of connecting parts of wire segments may be performed at the end of the stator where the bunched parts are located.

Figures 6A, 6B:
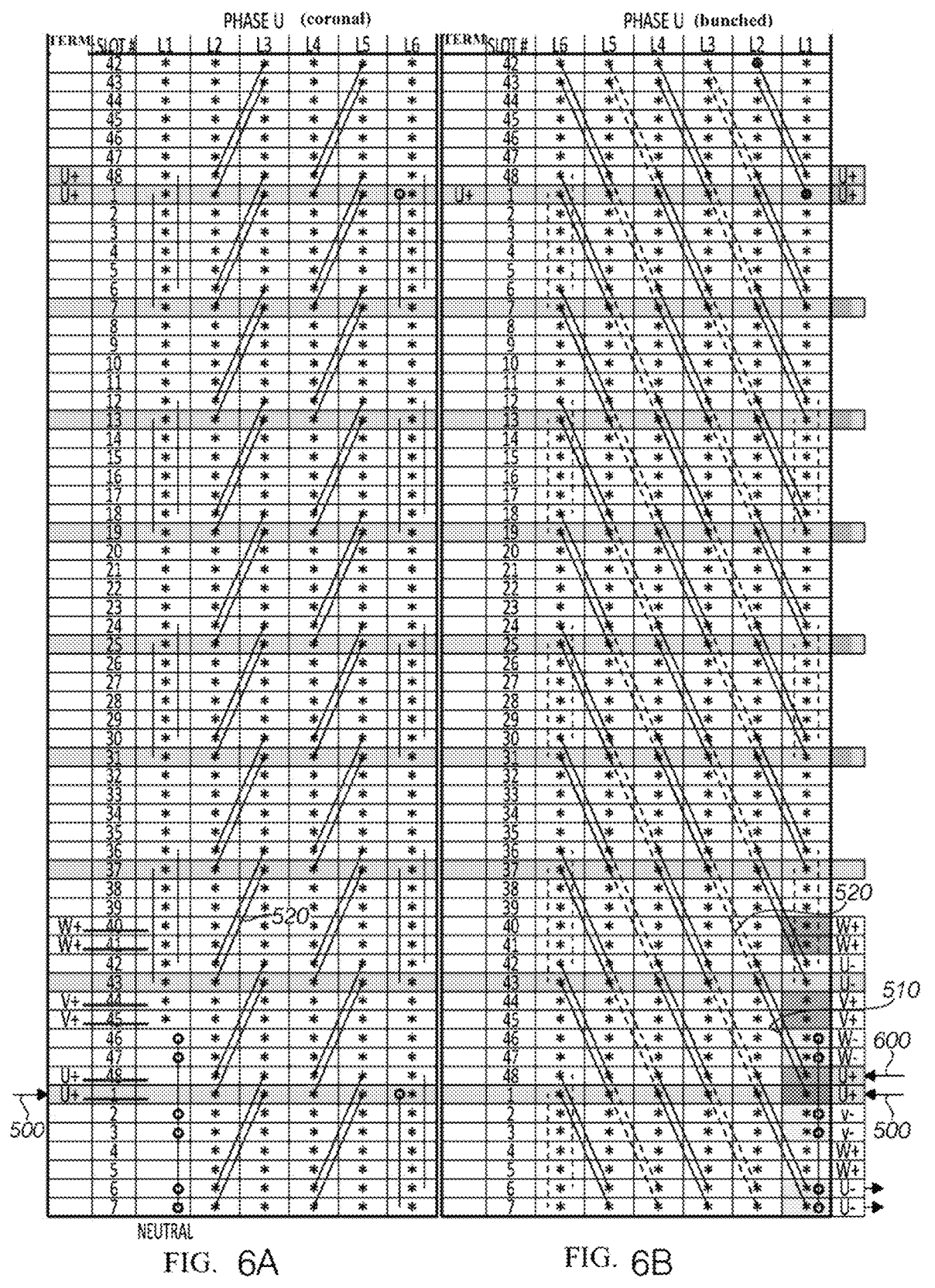
Figure 7:
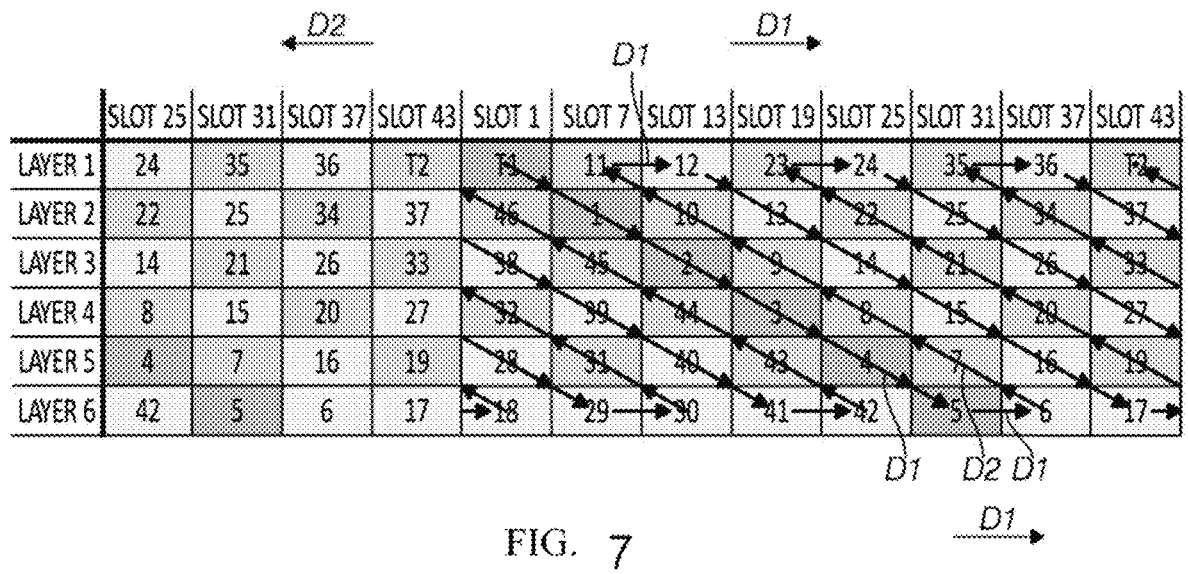
FIG. 7 shows a schematic diagram of a winding direction of a first wire according to the second embodiment.
Figure 8:
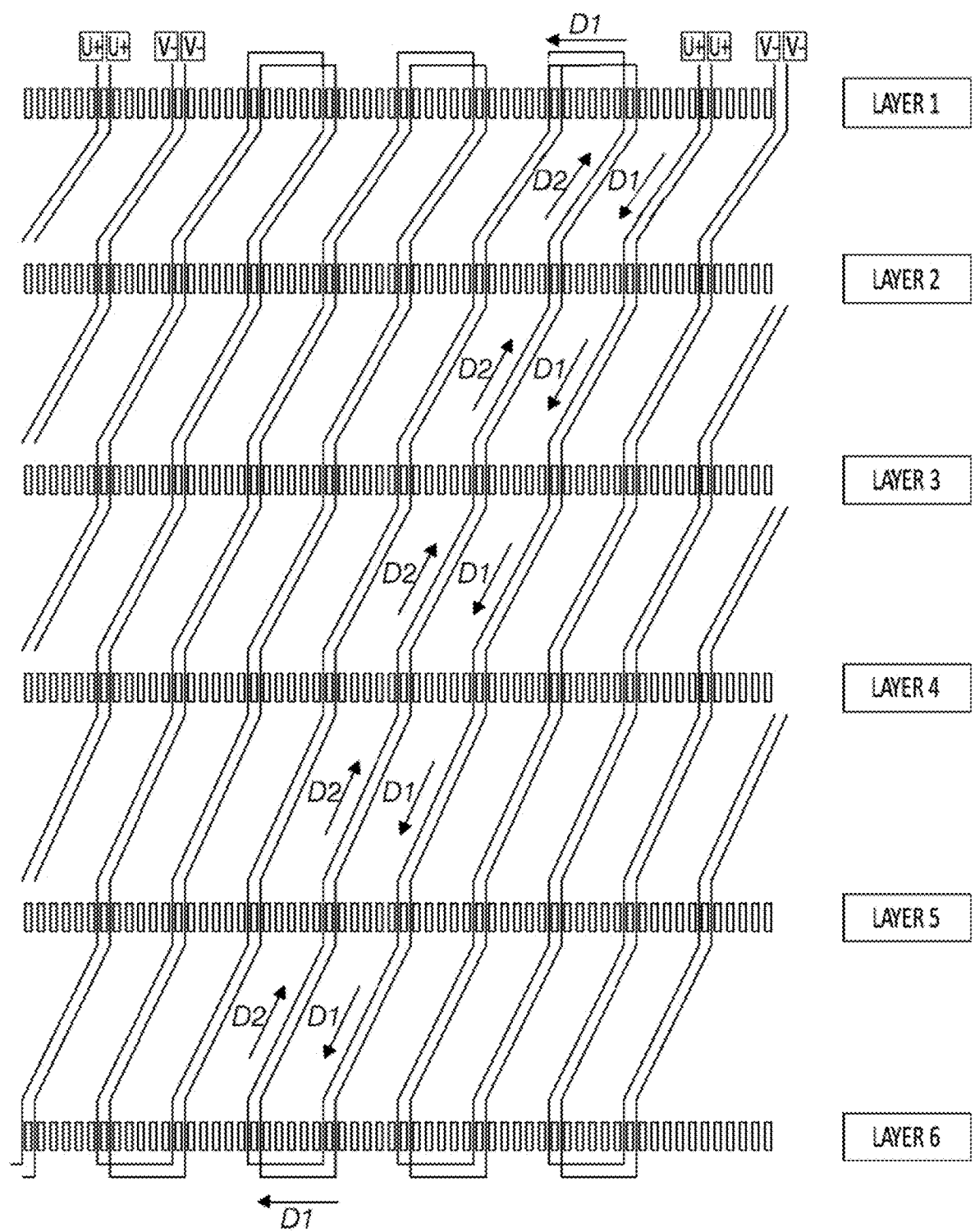
FIG. 8 shows a schematic diagram of inter-layer advancing of the winding according to the second embodiment.

FIG. 6A to FIG. 8 show a second embodiment. In the second embodiment, after the wire is positioned to the Mth layer in the first direction according to the first rule, in the Mth layer, the wire advances, in the first direction, to the next slot having the spacing of R by passing through the first same-layer transition. Afterwards, the wire is positioned in the second direction according to the second rule until the wire returns to the first layer. In the first layer, the wire also advances, in the first direction, to the next slot having the spacing of R by passing through the second same-layer transition; and then the manner of winding to the Mth layer according to the first rule, passing through the first same-layer transition, winding to the first layer according to the second rule, and passing through the second same-layer transition is repeated until the wire fills up the M layers in the slots having the spacing of R. Unlike the first embodiment, the wire in the second embodiment extends in the same layer in the first direction when passing through the first same-layer transition and the second same-layer transition. FIGS. 6A and 6B are expanded views of stator slots, showing the positioning of a wire U in the slots. FIG. 7 shows a schematic diagram of a winding direction of one complete phase conductor according to the second embodiment. FIG. 8 shows a schematic diagram of inter-layer advancing of the winding according to the second embodiment. In the second embodiment, the stator has 48 slots and 8 poles, with each slot having a depth capable of being filled with 6 layers of wires. The stator winding involves at least inter-slot design and inter-layer design as described above. The inter-slot design is the selection of positions of slots through which the wire is wound in the motor stator. The inter-layer design of the wire is the selection of positions of layers through which the wire is wound in the motor stator.

FIG. 6A is an expanded diagram viewed from a coronal end, which shows crowns of the wire only in solid lines. FIG. 6B is an expanded diagram viewed from a bunched end, where bunched parts are shown in solid lines and crowns are shown in dashed lines. FIGS. 6A and 6B show a U-phase wire formed by two wires. A winding manner is described by using a first wire 500 of the U-phase wire as an example. Referring to FIG. 6B, the first wire 500 may be inserted from a first layer of a first slot S01L1 and the wire advances according to a first rule. The wire advances from S01L1 to a next layer L2 of a next slot of Slot 43 having a spacing of R at a bunched end; that is, the wire advances from S01L1 to S43L2 at the bunched end, as shown by a solid line 510 in the figure. Afterwards, the wire passes the bunched end of S43L2 and reaches a coronal end, from which the wire extends to a next layer of a next slot S37L3. This segment of wire is shown as a dashed line S20 in FIG. 6B. Referring to FIG. 6A, this segment of wire is shown as a solid line 520 at the coronal end. Returning to FIG. 6B, the wire further advances to S31L4 at the bunched end and advances to S25L5 at the coronal end; the wire continues to advance in the same manner and reaches S19L6 at the bunched end. In the Mth layer, namely, the sixth layer, unlike the first embodiment, the wire 500 continues advancing to a next slot of the same layer S13L6 in the first direction, then turns back and is positioned in a second direction D2 according to a second rule in a layer number descending manner at a slot spacing of R, and the wire reaches the outermost layer L1 through S19L5, S25L4, S31L3, S371L2, and S431L1. In this case, the wire advances to a next slot of the same layer S37L1 in the first direction. The wire continues to be positioned according to the first rule. The first wire 510 is positioned according to the method in the embodiment of the present application; the first wire 500 is not crossing itself and fills up the 6 layers along the path of the first direction D1 and the second direction D2; and the wire extends out from S71L1 as the U-end. In addition, the figure also shows that in this embodiment, when the wire reaches the innermost layer or the outermost layer, namely, the sixth layer or the first layer, the wire advances to the next slot that is in the same layer in the first direction D1. The first wire fills up all the layers by repeatedly advancing in the manner of following the first rule, passing through the first same-layer transition, following the second rule, and passing through the second same-layer transition. It should be noted that the coronal end of the first wire 500 in FIG. 6B is shown in FIG. 6A accordingly. Similarly, a second wire 600 of the U-phase wire is wound in the same manner as that of the first wire using S48L1 as the starting slot. As described above, in this embodiment, phase U enters from first layers of Slot 48 and Slot 1, advances in the manner of following the first rule, passing through the first same-layer transition, following the second rule, and passing through the second same-layer transition to fill up 16 slots; the terminals extends out from first layers of Slot 6 and Slot 7. Similarly, for the illustrated three-phase winding, phase V may enter from first layers of Slots 44 and 45 shown in FIG. 6A and extends out from first layers of Slot 2 and Slot 3 according to a winding rule similar to that of phase U. Phase W may enter from first layers of Slots 40 and 41 and extends out from first layers of Slots 46 and 47. At the tail end, W-phase terminals of Slots 46 and 47, V-phase tail ends of Slot 2 and Slot 3, and U-phase terminals of Slot 6 and Slot 7 may be connected to each other to form, for example, the Neutral end as shown in the figure, i.e., the Zero end; and each of the individual initial input terminals of respective phases respectively extend therefrom, thus forming a 3-phase winding in the star connection manner.

Numbers are used in FIG. 7 to represent the advancing rule when winding the first wire 500 through slots; arrows are used to represent the advancing direction of the first wire. Similarly, the numbers themselves do not have specific meaning, and are merely used to illustrate the relative advancing positional relationships.

One might notice that in addition to the different advancing directions of the wire in the same layer in the innermost layer and the outermost layer from that in the first embodiment, the slot number in the example shown in FIG. 6A to FIG. 7 also changes, specifically, S1-S43-S37-S31-S25-S19. The serial numbers are different from those in the first embodiment; but it is to be understood that the first rule and the second rule still apply. No matter how the slot number and layer number are named, for example, whether the slot number ascends or descends in the clockwise or counterclockwise direction, the numbers do not have definite meaning, and are only used to represent relative positions. The first wire 500 also changes at a slot number spacing of R and at the same time, in a layer number ascending or descending manner, where the layer number ascending in one direction is the first rule, and the layer number descending at a slot number spacing of R in the other direction is the second rule. In the innermost layer or outermost layer between application of the first rule and the second rule, the wire advances or extends to a next slot having a spacing of R by passing through the same-layer transition in the same direction. The wire advances in the manner of following the first rule, passing through the first same-layer transition, following the second rule, and passing through the second same-layer transition; and the process is repeated until all the layers are filled up. Each slot in FIG. 6A and FIG. 6 has the wire positioned therein (see the asterisks). The wire enters from a slot in the first layer, is wound in the described manner and extends out from a slot of the first layer. The other two phases of wires follow the same rules.

FIG. 8 highlights the inter-layer setting of the wire positioned in the first direction D1 and the second direction D2 in the present invention. It can be observed that the layer number and the slot number change at the same time. In this example, the slots are no longer numbered since the focus here is the inter-layer setting. After entering a layer (for example, a first layer) of one phase (for example, Phase U) of the three phases of the motor, an input terminal (U+) passes through a slot and then enters a next layer in the direction D1 at a spacing of R slots. When the wire advances forward in the layer number, the number of slots the wire passes through also changes. When the wire reaches the innermost layer or the outermost layer, the wire advances in the first direction D1 and passes through a slot having the spacing of R slots in the same layer and then enters the previous layer at the spacing of R slots in the second direction D2. When the wire reaches the outermost layer or the innermost layer, the wire advances in the first direction D1 and passes through a slot having the spacing of R slots in the same layer. The rest of the positioning is achieved by following the same manner. The positioning of the wire in all the layers are achieved according to this rule until an output terminal (U−) extends out from the same layer where the input terminal (U+) is located. Thus, respective phases of wires pass through the slots and the layers in parallel to form a special arrangement that is parallel and regular; each phase (U/V/W) of wire advances and is positioned with the layers and slots changing at the same time. When the reached layer is the innermost or outermost layer, the wire advances in the first direction D1 and in a manner opposite to the layer number ascending or descending manner.

In the first embodiment, when the reached layer is the innermost layer or the outermost layer, the wire advances to a next slot of the same layer in the second direction D2. In the second embodiment, when the reached layer is the innermost layer or the outermost layer, the wire advances to a next slot of the same layer in the first direction D1. Both wire winding manners are implementable. The rectangular wire winding for a driving motor of a vehicle provided in one or a plurality of embodiments of the present application can achieve a higher slot fill factor for the motor stator and can meet motor design requirements in which increasingly high performance is needed; the positioning manner of the wire that is parallel and regular provided in this embodiment employs a rectangular wire to implement a spatially-compact and non-crossing winding structure that at the same time fulfills the excitation requirements.

In the plurality of embodiments described above, the slot number is 48; the slot number per pole per phase is 2; the pole number is 8; the phase number is 8; and the layer number is 6. It is to be understood that the winding method in the present application can be used in motors having other parameters. The slot number N=a slot number per pole per phase*a pole number*a phase number; the slot number a per pole per phase is an integer phase number from 1 to 5; the pole number is 2, 4, 6, 8, 10, or 12; and the phase number is an integer from 1 to 5. In yet another embodiment, the layer number M may be, for example, 4 to 12.

Figures 9A, 9B:
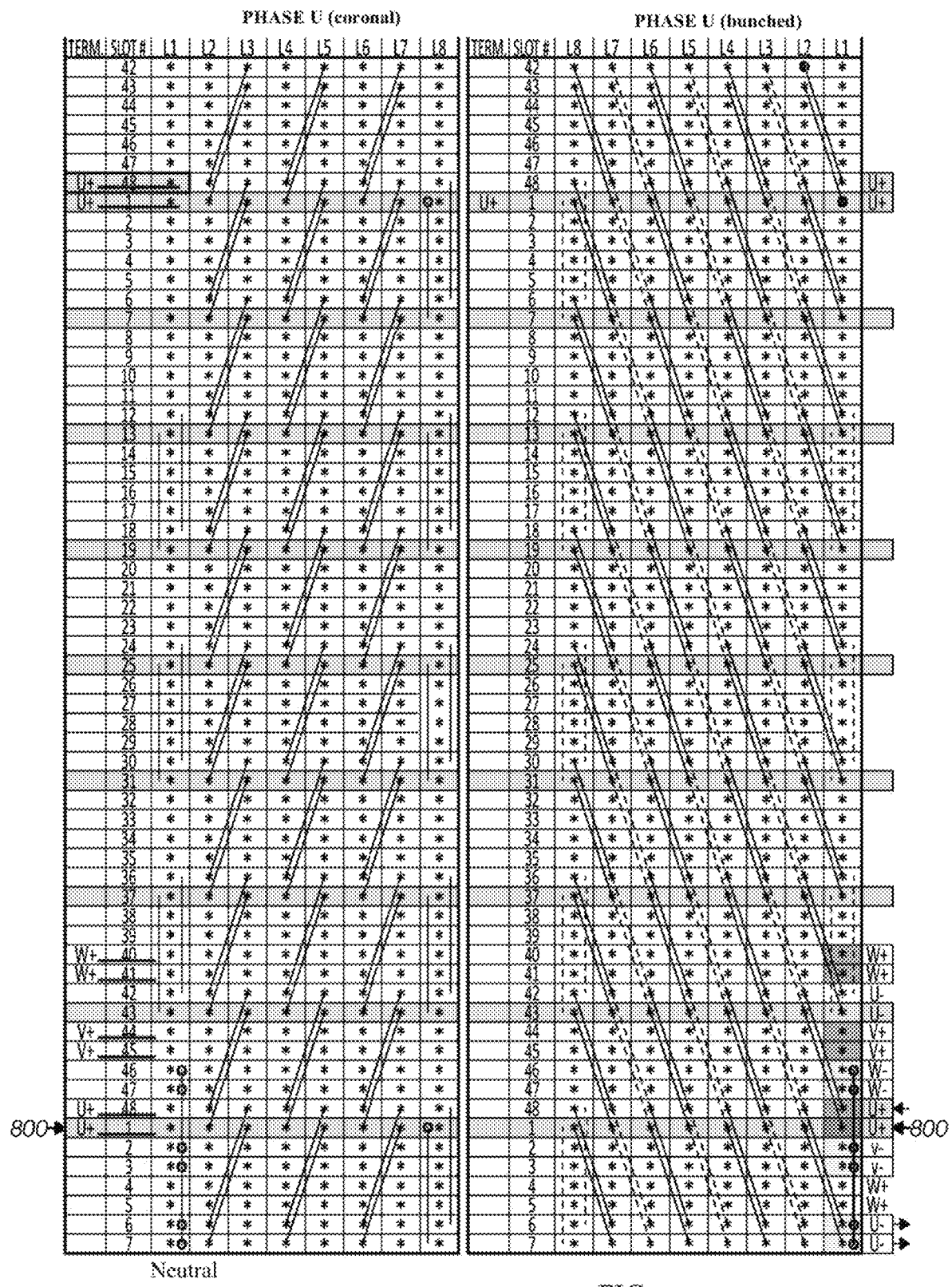
FIG. 9 shows an inter-slot and inter-layer winding manner of a winding having 8 layers of wires according to a third embodiment of the present invention.
Figure 10:
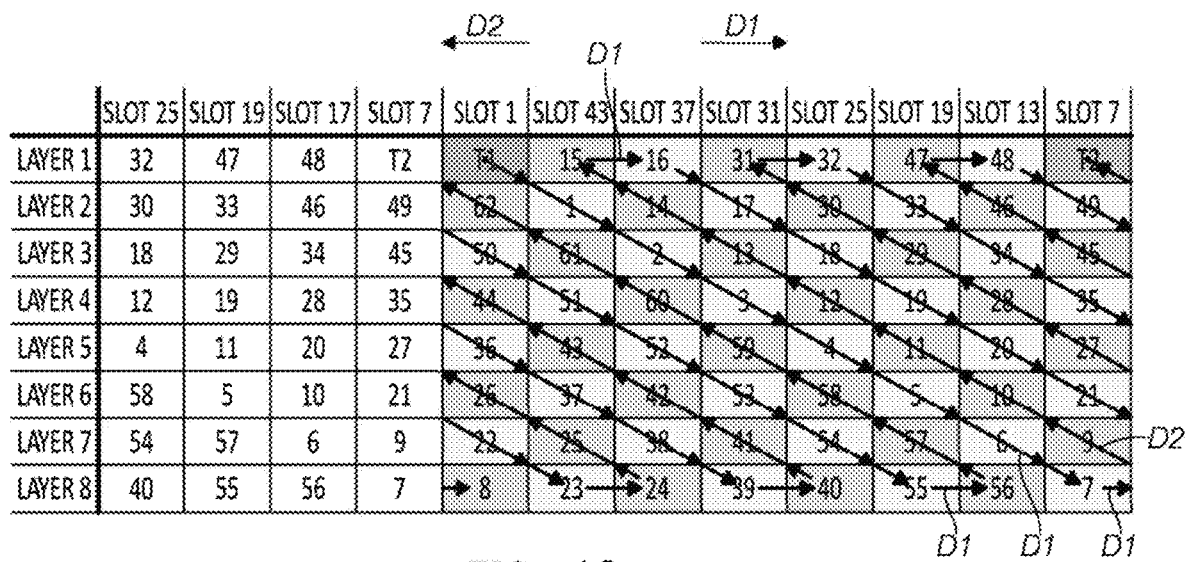
FIG. 10 shows a schematic diagram of a winding direction of a first wire according to the third embodiment.
Figure 11:
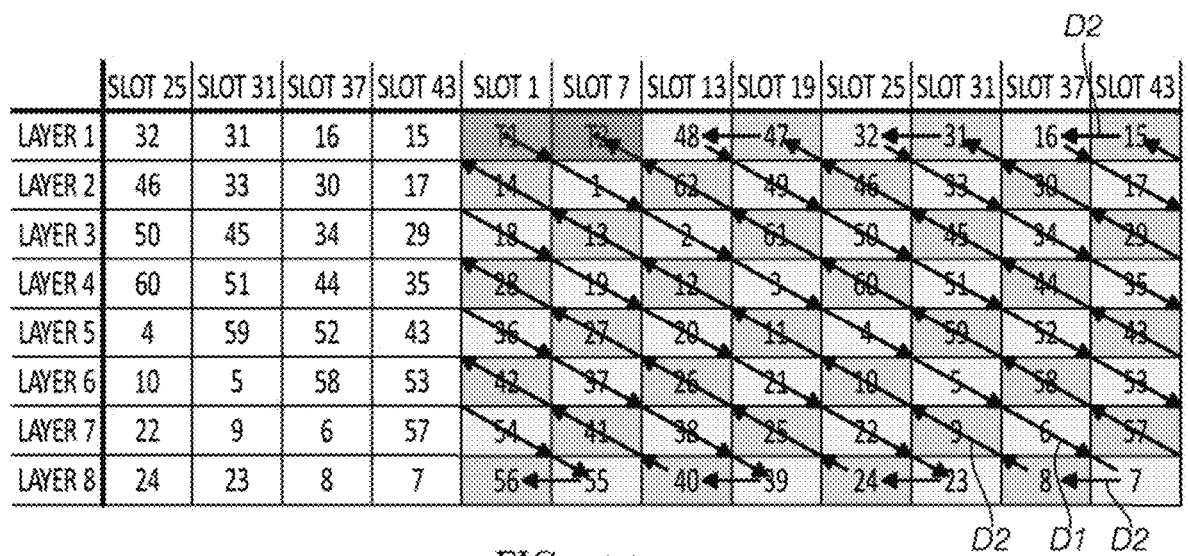
FIG. 11 shows a schematic diagram of a winding direction of one complete phase conductor having 8 layers of wires according to a fourth embodiment of the present application.
Figure 12:
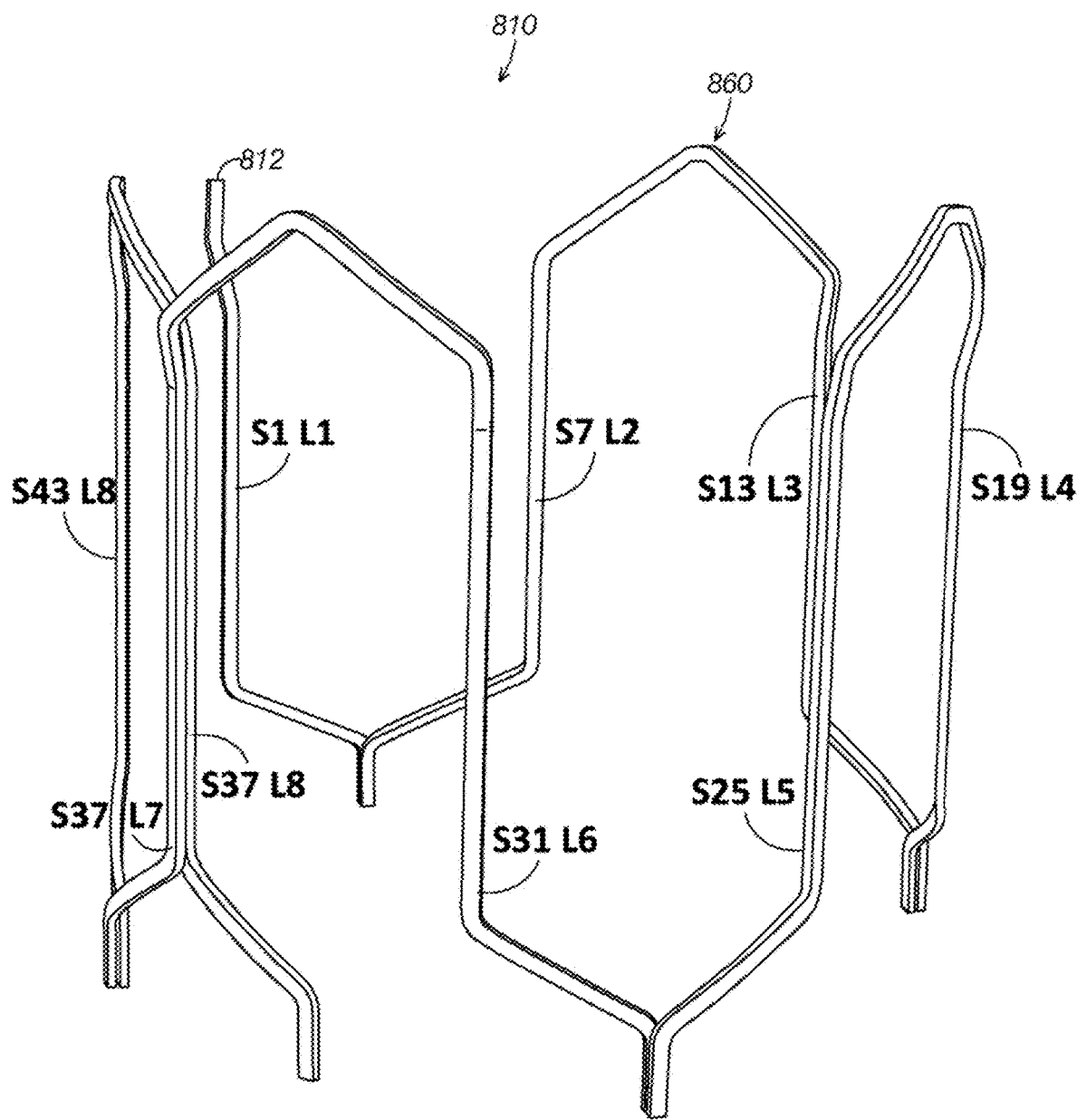
FIG. 12 shows wire segments and a connection mode of a wire winding according to the fourth embodiment.
Figure 13:
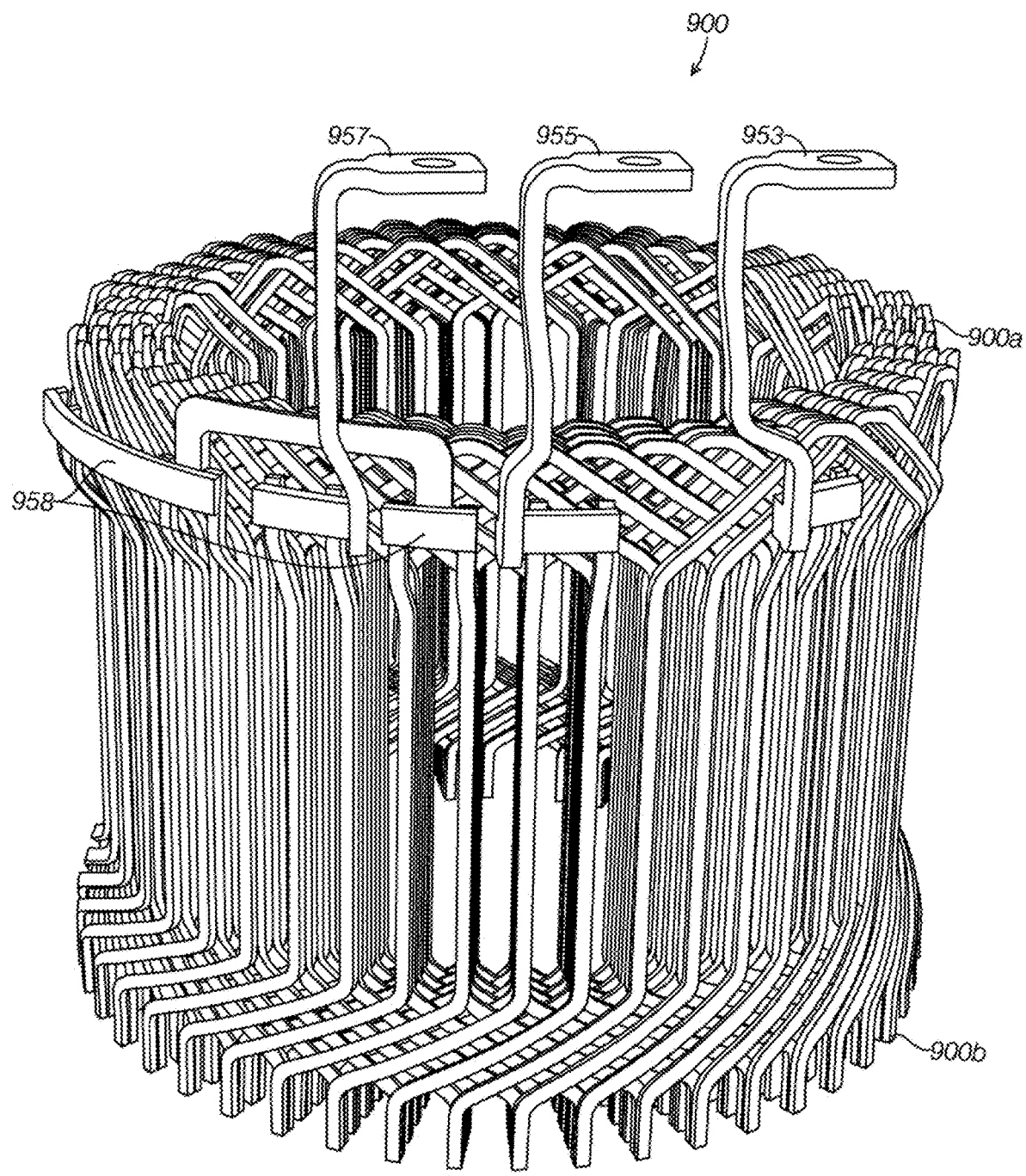
FIG. 13 schematically shows a perspective view of a winding after three-phase winding is completed according to the fourth embodiment.

FIG. 9A to FIG. 12 show schematic diagrams of a wire winding of a winding having 8 layers of wires. FIGS. 9A to 10 show a third embodiment in which the advancing is done in the same layer in a first direction. FIGS. 11 to 13, on the other hand, show a fourth embodiment in which the advancing is done in the same layer in a second direction.

As shown in FIGS. 9A to 10, the M layers of the winding in this embodiment are 8 layers. A first wire 800 of a first phase conductor is positioned in a first direction D1 (for example, clockwise direction) and advances in a layer number ascending manner at a spacing R according to the first rule. The advancing direction is indicated by arrows. FIG. 9A is an expanded diagram viewed from a coronal end, which only shows crowns of the wire in solid lines. FIG. 9B is an expanded diagram viewed from a bunched end, where bunched parts are shown in solid lines and crowns are shown in dashed lines. The table in FIG. 10 shows slots the first wire 800 passes into: S1, S43, S37, S31, S25, S19, S13, and S7. The spacing slot R between various positions of the first wire 800 is 6. The numbers in the figure represent the sequence in which the first wire 800 passes through slots; the arrows represent the advancing direction of the first wire 800. The starting slot of the first wire 800 is shown by a first terminal T1 in FIG. 10. The terminating slot of the first wire 800 is shown by a second terminal T2 in FIG. 10. As shown in FIG. 9B and FIG. 10, the first wire 800 is wound through S1L1, S43L2, S37L3, S31L4, S25L5, S19L6, S13L7, and S7L8 according to the first rule. After reaching the Mth layer (namely, the eighth layer), the first wire 800 transitions and advances, in the same layer of the eighth layer, to S1L8 in the first direction D1 (namely, advances in the same layer in the first direction). Then, the first wire 800 is wound according to the second rule and passes through S7L7, S13L6, S19L5, S25L4, S31L3, S37L2, and S43L1 in the second direction D2. Then, the first wire 800 also advances in the first layer, namely, passes through the second same-layer, to S37L1 in the first direction D1 (namely, advances in the same layer in the first direction). Then, the first wire 800 continues to advance in the manner of following the first rule, the first same-layer advance, following the second rule, and the second same-layer advance until the wire extends out from the first layer S7L1 (T2 in FIG. 10). As indicated by the numbers and arrows in the figure, the first wire 800 is positioned according to the method in the present invention; the first wire 800 is not crossing itself and fills up the 8 layers along the path of the first and second directions. A second, a third, a fourth, a fifth, and a sixth wire may be positioned in different slots of the stator in the same manner to fill up the 48 slots of the stator, and form 8 layers of wires. It should be noted that the coronal end of the first wire 800 in FIG. 9B is shown in FIG. 9A accordingly. Similarly, a second wire 802 of the U-phase wire is wound in the same manner as that of the first wire using S48L1 as the starting slot. As shown in FIGS. 9A and 9B, phase U enters from first layers of Slot 48 and Slot 1, advances in the manner of following the first rule, passing through the first same-layer transition, following the second rule, and passing through the second same-layer transition to fill up 16 slots; and the terminals extends out from first layers of Slot 6 and Slot 7. Similarly, for the three-phase winding as shown in the figure, phase V may enter from first layers of Slots 44 and 45 shown in FIG. 9A and extends out from first layers of Slot 2 and Slot 3 according to a winding rule similar to that of phase U. Phase W may enter from first layers of Slots 40 and 41 and extends from first layers of Slots 46 and 47. At the tail end, W-phase terminals of Slots 46 and 47, V-phase tail ends of Slot 2 and Slot 3, and U-phase terminals of Slot 6 and Slot 7 may be connected to each other; and input terminals of respective phases respectively extend therefrom to form a 3-phase winding in a star connection manner similar to the manner of the first embodiment.

FIGS. 11 and 12 show schematic diagrams of a connection manner of the winding having 8 layers of wires. However, unlike FIGS. 9A to 10, when the wire enters the innermost layer or the outermost layer, the wire advances in the same layer in the second direction D2. Similarly, when a wire enters from a first layer of a first slot S1L1 and T1 is used to represent a first terminal, first the wire is positioned according to the first rule. Specifically, the first wire is extended so it passes through (1+R), namely, a second layer L2 of slot S7; and the first wire continues to advance to S13L3, S19L4, s25L5, s31L6, s37L7, and S43L8 in the current direction (for example, the clockwise direction). In this example, L8 is already the innermost layer; and thus advancing of the first same-layer may be performed to advance to S37L8 of the same layer in the second direction (namely, the counterclockwise direction). Afterwards, the wire continues to be positioned according to the second rule. Specifically, the wire returns to S31L7, continues to advance in a layer number descending manner and at the same time ata slot number spacing of R to S25L6, S19L5, S13L4, S7L3, S1L2, and S43L1; in this case, the wire makes a turn, passes through the second same-layer transition, and advances in the second direction (the clockwise direction) to S37L1. The manner of following the first rule, passing through the first same-layer transition, following the second rule, and passing through the second same-layer transition is repeated until all the layers are filled up (slots of the phase are all filled up). Each slot and layer as shown in the figure has winding at corresponding positions without the wire crossing itself. The wire will finally extend out from the first layer S7L1 at a spacing of 6 slots. T2 is used to represent the second terminal from which the wire extends.

FIGS. 12 and 13 show specific wire segments and a connection mode capable of implementing the winding according to the fourth embodiment in FIG. 11. Like the wire embodiment shown in FIG. 4, the first wire 810 includes a first lead segment 812 and a plurality of U-shaped wire segments 860 connected in sequence. Similarly, the U-shaped wire has a first and a second supporting leg located in two slots having a spacing of R. A plurality of supporting legs are respectively located in slots S1, S7, S13, S19, S25, S31, S37, and S43, and are connected to one another at bunched ends. The U-shaped crowns and the bunched parts of the wire segments advance alternately so that the first wire 810 is positioned according to the first and second rules, thereby implementing the winding where all layers of the phase are filled with the wire shown in FIG. 11.

FIG. 13 shows a schematic diagram of a winding 900 after three-phase winding is completed in the fourth embodiment. The winding 900 has a coronal end 900a and a bunched end 900b. The three phases of wires are formed by connecting two wires in parallel. Three terminals 953, 955, and 957 are formed at one end, whereas the other ends 958 of the three phases are connected to one another.

Figure 14:
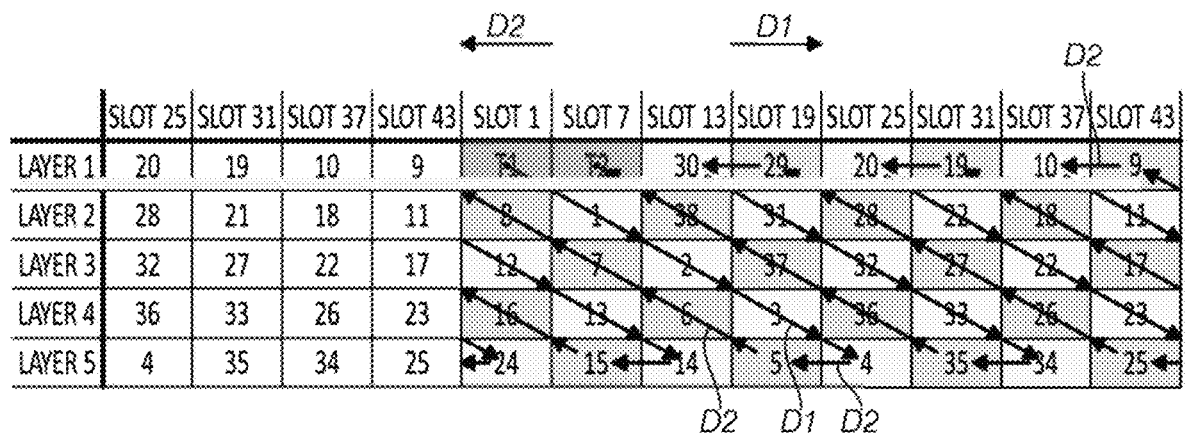
FIG. 14 illustrates a schematic diagram of a winding direction of a first wire having 5 layers of wires according to a fifth embodiment of the present invention.

FIG. 14 shows a fifth embodiment of a winding having 5 layers of wires. A first wire still follows the aforementioned manner: following a first rule of advancing in a layer number ascending manner in a first direction D1; advancing in a second direction D2 when passing through a first same-layer transition; following a second rule of advancing in a layer number descending manner in a second direction D2; and advancing in the second direction D2 when passing through a second same-layer transition. The specific winding process is not described herein again. According to the winding described above, the wire can advance in the layer number ascending or layer number descending manner without crossing itself and can be fully positioned in all of the five layers.

Figure 15:
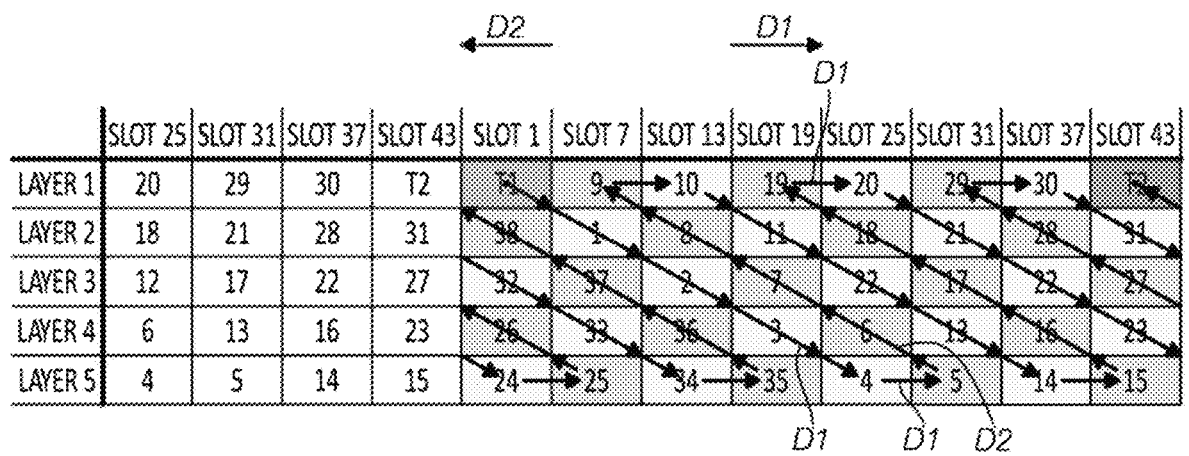
FIG. 15 shows a schematic diagram of a winding direction of a first wire having 5 layers of wires according to a sixth embodiment.

FIG. 15 shows a sixth embodiment of a winding manner having 5 layers of wires. A wire still follows the aforementioned manner: following a first rule of advancing in a layer number ascending manner in a first direction D1; advancing in a first direction D1 when passing through a first same-layer transition; following a second rule of advancing in a layer number descending manner in a second direction D2; and advancing in the first direction D1 when passing through a second same-layer transition. The specific winding process is not described herein again. Thus, the wire can advance in the layer number ascending or layer number descending manner without crossing itself and can be fully positioned in all of the five layers.

A stator winding method, a winding formed by regular winding, and a stator including the winding are provided in one or a plurality of embodiments of the present application. The rectangular wire winding for a driving motor of a vehicle provided in one or a plurality of embodiments of the present application can achieve a higher slot fill factor for the motor stator; the positioning of the wire that is parallel and regular employs a rectangular wire to implement a spatially-compact and non-crossing winding structure that at the same time fulfills the excitation requirements. Further, because the wire has small bending angles (no need to form sharp angles), desirable insulation performance is achieved. Various changes, modifications, and alterations can be made by those skilled in the art to these specific embodiments without departing from the essence and scope defined in the claims of the present application.

The claims particularly point out specific combinations and sub-combinations that are considered novel and not obvious. These claims may involve "an" element or "a first" element or similar features. Such claims should be understood asincluding one or a plurality of such elements, where two or a plurality of such elements are neither required nor excluded. Other combinations and sub-combinations of features, functions, elements, andior properties described may be claimed through amendment of the current claims or presentation of new claims in the present application or a related application. Such claims, whether broader or narrower than, equivalent to, or different from the original claims, should be regarded as included within the subject matter of the present application.

The invention claimed is:

1. A stator core winding for a motor, wherein the stator core winding is wound in N slots of a stator and forms M layers, the stator core winding comprising:
  a first wire that passes through a first layer of a first slot to be positioned in a first direction according to a first rule, the first rule comprising positioning the first wire at a spacing of R slots in a layer number ascending manner until reaching an Mth layer;
  in the Mth layer, the first wire passes a first same-layer transition and advances to the Mth layer having the spacing of R;
  the first wire is positioned in a second direction opposite to the first direction according to a second rule, the second rule comprising positioning the first wire at the spacing of R slots in a layer number descending manner until reaching the first layer;
  in the first layer, the first wire passes through a second same-layer transition and advances to the first layer having the spacing of R; and
  the first wire advances in the first direction and the second direction by repeating the manner of following the first rule, passing the first same-layer transition, following the second rule, and passing the second same-layer transition until the first wire fills up the M layers without crossing itself and extends out from the first layer, the first same-layer transition and the second same-layer transition being in a same direction.

2. The stator core winding according to claim 1, wherein N=48, R=6, and M=6.

3. The stator core winding according to claim 1, wherein N=48, M=8, and R=6, and the first wire is a first phase conductor, wherein the first phase conductor occupies 16 slots, the stator core winding further comprises a second phase conductor and a third phase conductor, wherein the second phase conductor and the third phase conductor each occupy 16 slots, both starting from the first layer, and are wound on the stator according to the same rule the first phase conductor follows.

4. The stator core winding according to claim 1, wherein the first direction is a clockwise direction, and wherein the second direction is a counterclockwise direction.

5. The stator core winding according to claim 1, wherein the first direction is a counterclockwise direction, and wherein the second direction is a clockwise direction.

6. The stator core winding according to claim 1, wherein
  the first wire is formed by connecting a plurality of wire segments;
  the stator comprises a first end and a second end opposite to the first end;
  the N slots are located between the first end and the second end;
  an ith U-shaped wire segment comprises a U-shaped crown located at the first end, a first supporting leg and a second supporting leg connected to the crown, and a first connecting part and a second connecting part located at the second end and respectively connected to the first supporting leg and the second supporting leg;
  the first supporting leg and the second supporting leg of the ith U-shaped wire segment are respectively located in two slots having the spacing of R;
  an (i+1)th U-shaped wire segment comprises a U-shaped crown located at the first end, a first supporting leg and a supporting second leg connected to the crown, and a first connecting part and a second connecting part located at the second end and respectively connected to the first supporting leg and the second supporting leg;
  the first supporting leg and the second supporting leg of the (i+1)th U-shaped wire segment are respectively located in two slots having the spacing of R;
  the second connecting part of the ith U-shaped wire segment and the first connecting part of the (i+1)th U-shaped wire segment are connected to form a bunched part located at the first end; and
  the U-shaped crowns and the bunched parts alternately advance so that the first wire is positioned in the slots according to the first rule and the second rule, and the first wire is provided with a rectangular or square cross section.

7. A stator for a motor, the stator comprising:
  a first end;
  a second end;
  a main body connecting to the first end and the second end, wherein the main body comprises a hollow inner wall;
  N slots, wherein the N slots are formed on the inner wall, located between the first end and the second end, face a central axis of the main body, and provided with a depth capable of accommodating a cross section of M layers of wires; and
  a winding, the winding comprising a first wire, wherein
    the first wire passes through a first layer of a first slot to be positioned in a first direction according to a first rule, the first rule comprising positioning the first wire at a spacing of R slots in a layer number ascending manner until reaching an Mth layer,
    in the Mth layer, the first wire passes a first same-layer transition and advances to a next slot having the spacing of R,
    the first wire is positioned in a second direction opposite to the first direction according to a second rule, the second rule comprising positioning the first wire at the spacing of R slots in a layer number descending manner until reaching the first layer, in the first layer, the first wire passes through a second same-layer transition and advances to a next slot having the spacing of R, the first wire advances in the first direction and the second direction by repeating the manner of following the first rule, passing the first same-layer transition, following the second rule, and passing the second same-layer transition until the first wire fills up the M layers without crossing itself and extends out from the first layer, and the same-layer transition in the Mth layer and the same-layer transition in the first layer are in the same direction.

* * * * *